United States Patent
Som et al.

(10) Patent No.: US 11,715,978 B2
(45) Date of Patent: Aug. 1, 2023

(54) COIL ARRANGEMENT AND DEVICE FOR THE WIRELESS ELECTROMAGNETIC TRANSMISSION OF ENERGY

(71) Applicant: Würth Elektronik eiSos GmbH & Co. KG, Waldenburg (DE)

(72) Inventors: Cem Som, Zorneding (DE); Christopher Schaffelhofer, Olching (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 0 days.

(21) Appl. No.: 16/941,161

(22) Filed: Jul. 28, 2020

(65) Prior Publication Data
US 2021/0036552 A1 Feb. 4, 2021

(30) Foreign Application Priority Data
Jul. 31, 2019 (DE) ...................... 10 2019 211 399.0

(51) Int. Cl.
| | |
|---|---|
| *H02J 50/12* | (2016.01) |
| *H01F 38/14* | (2006.01) |
| *H02J 50/40* | (2016.01) |
| *H01F 27/29* | (2006.01) |

(52) U.S. Cl.
CPC .............. *H02J 50/12* (2016.02); *H01F 27/29* (2013.01); *H01F 38/14* (2013.01); *H02J 50/40* (2016.02)

(58) Field of Classification Search
None
See application file for complete search history.

(56) References Cited

U.S. PATENT DOCUMENTS

| | | | |
|---|---|---|---|
| 4,939,400 A | 7/1990 | Matsushita et al. | |
| 9,072,398 B2* | 7/2015 | Choo | E05F 15/77 |
| 9,356,383 B2 | 5/2016 | Waffenschmidt et al. | |
| 2009/0096413 A1 | 4/2009 | Partovi et al. | |
| 2010/0001823 A1* | 1/2010 | Kawarai | H01F 17/0013 |
| | | | 336/200 |
| 2010/0007230 A1* | 1/2010 | Suzuki | H02K 3/26 |
| | | | 310/90 |
| 2010/0219183 A1 | 9/2010 | Azancot et al. | |
| 2011/0043050 A1* | 2/2011 | Yabe | H01F 38/14 |
| | | | 307/104 |

(Continued)

FOREIGN PATENT DOCUMENTS

| | | |
|---|---|---|
| AT | 515624 A1 | 10/2015 |
| CN | 101310346 A | 11/2008 |

(Continued)

*Primary Examiner* — Daniel Kessie
*Assistant Examiner* — Terrence R Willoughby
(74) *Attorney, Agent, or Firm* — McGlew and Tuttle, P.C.

(57) ABSTRACT

A coil arrangement for the wireless electromagnetic transmission of energy includes a carrier which forms a main direction of extent. On the carrier element, are attached in succession in the main direction of extent and connected to one another. The carrier element comprises a ferrite material and at least one desired parting location which is designed as a perforation and/or notch arrangement. The coil arrangement can be easily adapted in a flexible way to a rotatable component and attached thereto. This makes easy wireless electromagnetic transmission of energy possible.

26 Claims, 7 Drawing Sheets

(56) References Cited

U.S. PATENT DOCUMENTS

| | | | | |
|---|---|---|---|---|
| 2013/0285783 | A1* | 10/2013 | Yussof | H01Q 1/2208 |
| | | | | 336/138 |
| 2016/0036245 | A1* | 2/2016 | Chang | H02J 50/402 |
| | | | | 307/104 |
| 2016/0163451 | A1* | 6/2016 | Wang | H01F 41/042 |
| | | | | 336/192 |
| 2016/0322156 | A1* | 11/2016 | Yeh | H01F 38/14 |
| 2018/0069299 | A1* | 3/2018 | Kang | H04B 5/0081 |
| 2018/0233801 | A1 | 8/2018 | Peralta et al. | |
| 2018/0233967 | A1* | 8/2018 | Peralta | H04B 5/0037 |
| 2020/0177027 | A1* | 6/2020 | Sato | H01F 38/14 |
| 2020/0259370 | A1* | 8/2020 | Ichikawa | H02J 50/402 |

FOREIGN PATENT DOCUMENTS

| | | |
|---|---|---|
| CN | 102906832 A | 1/2013 |
| DE | 199 48 454 A1 | 5/2001 |
| JP | S58 003365 B2 | 1/1983 |
| JP | 2011101485 A | 5/2011 |
| JP | 2013140880 A | 7/2013 |
| JP | 2016 63 683 A | 4/2016 |
| JP | 2018-29169 A | 2/2018 |

\* cited by examiner

COIL ARRANGEMENT AND DEVICE FOR THE WIRELESS ELECTROMAGNETIC TRANSMISSION OF ENERGY

CROSS-REFERENCES TO RELATED APPLICATIONS

This application claims the priority of German Patent Application, Serial No. 10 2019 211 399.0, filed Jul. 31, 2019, pursuant to 35 U.S.C. 119(a)-(d), the content of which is incorporated herein by reference in its entirety as if fully set forth herein.

FIELD OF THE INVENTION

The invention relates to a coil arrangement and to a device for the wireless electromagnetic transmission of energy. In addition, the invention relates to a component coil arrangement and to a method for producing such a component coil arrangement.

BACKGROUND OF THE INVENTION

In industrial installations it is generally necessary to transmit energy between a stationary component and a rotating component. For example it may be necessary to transmit energy to a rotating shaft in order to supply energy to consumers, such as for example sensors, which are arranged on the shaft. The wireless electromagnetic transmission of energy has proven valuable for such applications.

A device for wireless electromagnetic transmission of energy with a transmitter unit and a receiver unit is known from JP 2016-63683 A. The receiver unit comprises a carrier element on which a plurality of coils is arranged and connected with each other. The carrier unit is for example arranged on a curved surface of a rotating component.

SUMMARY OF THE INVENTION

The invention is based on an object of providing a coil arrangement for the wireless electromagnetic transmission of energy which can be used easily and flexibly for a wide variety of rotatable components.

This object is achieved by means of a coil arrangement for the wireless electromagnetic transmission of energy, having

- a carrier element which forms a main direction of extent, and
- a plurality of coils, wherein at least some of the coils are attached to the carrier element in the main direction of extent and connected to one another.

The coil arrangement according to the invention can be provided easily and flexibly by means of an endless coil arrangement. For this purpose, the endless coil arrangement or the coil arrangement has a structure which repeats in the main direction of extent. The endless coil arrangement or the coil arrangement is preferably of modular design. The coils are, in particular, bonded onto the carrier element. The coil arrangement according to the invention can be separated from the endless coil arrangement easily and flexibly. For this purpose, the carrier element is divided transversely with respect to the main direction of extent, preferably between two coils which are connected to one another, in such a way that the carrier element or the coil arrangement has in the main direction of extent a length $L_U$ which corresponds essentially to the circumference U of the rotatable component. The coil arrangement which is adapted in terms of length $L_U$ can subsequently be easily attached to the component about the rotational axis. The coil arrangement can therefore be used for the wireless electromagnetic transmission of energy to the rotating component or from the rotating component.

The endless coil arrangement has a length L in the main direction of extent, wherein the following applies: 1 m≤L≤200 m, in particular 5 m≤L≤100 m and in particular 10 m≤L≤50 m. A number Z of coils are attached to the carrier element. For the number Z in particular the following applies: 10≤Z≤2000, in particular 50≤Z≤1000 and in particular 100≤Z≤500. The carrier element of the endless coil arrangement has a width B perpendicularly with respect to the main direction of extent, wherein the following preferably applies: 1≤L/B≤1000, in particular 2≤L/B≤800 and in particular 4≤L/B≤600. The endless coil arrangement is, for example, wound on in the form of a reel and/or arranged in reel packaging.

By virtue of the at least one desired parting location, the coil arrangement can be separated from the endless coil arrangement with a length LU which corresponds essentially to the circumference of a rotating component. The at least one desired parting location runs transversely, in particular perpendicularly, with respect to the main direction of extent. The at least one desired parting location is embodied as a perforation and/or notch arrangement. The ferrite material easily permits efficient transmission of energy. The ferrite material directs, amplifies and/or screens the magnetic field.

A coil arrangement, in which the carrier element has a thickness D, wherein the following applies: 0.1 mm≤D≤2.5 mm, in particular 0.5 mm≤D≤2 mm, and in particular 1 mm≤D≤1.5 mm, ensures easy and flexible use. By virtue of the thickness D the carrier element has, on the one hand, sufficient deformability in order to be attached to a curved surface of a rotatable component. On the other hand, the thickness D ensures sufficient stability for attaching the coils to the carrier element. The thickness D is defined perpendicularly with respect to a carrier element surface in a vertical direction.

A coil arrangement, in which the carrier element is of deformable design for arrangement on a curved surface of a component, ensures easy and flexible use. By virtue of the fact that the carrier element is embodied in a deformable, in particular bendable and/or stretchable fashion, the carrier element can easily and flexibly be adapted to a curved surface and attached there. As a result, the coil arrangement can easily be arranged along the circumference of a rotating component.

A coil arrangement, in which the carrier element comprises a ferrite material, ensures easy and flexible use.

A coil arrangement, in which an attachment means for attaching to a component is arranged on a side of the carrier element facing away from the coils, ensures easy and flexible use. The coil arrangement can be easily attached to the curved surface of the component by means of the carrier element, using the attachment means. Suitable attachment means are, for example, adhesive or an adhesive layer, a double-sided adhesive tape, an adhesive film and/or touch and close fasteners.

A coil arrangement, in which the carrier element comprises at least one desired parting location, which is arranged, in particular, between coils which are connected in series, ensures easy and flexible use. By virtue of the fact that the at least one desired parting location is arranged between coils arranged in series, on the one hand the contact between the coils can easily be eliminated and, on the other hand, a coil can be prevented from being damaged or destroyed.

A coil arrangement, in which the carrier element comprises a plurality of desired parting locations, which, in particular, are spaced apart in the main direction of extent, ensures easy and flexible use. By virtue of the desired parting locations the length $L_U$ can be adapted with a small modular dimension $\Delta L_U$ to the circumference U of the rotating component. The modular dimension $\Delta L_U$ can be set by means of the diameter of the coils. The smaller the modular dimension $\Delta L_U$, the more precisely the coil arrangement can be adapted in its length $L_U$ to the circumference of the rotating component. As a result of the fact that a plurality of desired parting locations are spaced apart in the main direction of extent, the carrier element can be divided between coils which are respectively arranged in succession in the main direction of extent. The carrier element preferably has a desired parting location between, in each case, two coils which are arranged adjacent to one another in the main direction of extent. The respective desired parting location is preferably arranged between coils which are arranged in series. The desired parting locations run transversely, in particular perpendicularly, with respect to the main direction of extent. The desired parting locations are formed, for example, as a perforation and/or notch arrangement.

A coil arrangement, the coils are wound in a spiral shape, ensures easy and flexible use. As a result of the fact that the coils are wound in a spiral shape they are embodied as flat coils. The coils preferably each have a maximum of two winding layers, and in particular precisely one winding layer. The coils are attached to the carrier element in such a way that a respective coil axis runs essentially perpendicularly with respect to the carrier element surface. By virtue of the spiral-shaped formation of the coils, on the one hand they can be adapted in an easy and flexible way to a curved surface of a rotatable component and, on the other hand, they generate comparatively little unbalance at the rotating component.

A coil arrangement, in which the coils each comprise two connecting contacts which are arranged offset with respect to one another by an angle $\alpha$, wherein the following applies: $60° \leq \alpha \leq 300°$, in particular $90° \leq \alpha \leq 270°$, and in particular $120° \leq \alpha \leq 240°$, ensures easy and flexible use. By virtue of the arrangement of the two connecting contacts of the respective coil, the coils can be attached in succession to the carrier element easily and flexibly in the main direction of extent and can be connected to one another. The following preferably applies to the angle $\alpha$: $\alpha=90°$ and/or $\alpha=180°$.

A coil arrangement, at least one contact element for forming contact with coils is arranged on the carrier element ensures easy and flexible use. The at least one contact element permits easy connection of the coils. The at least one contact element is embodied from an electrically conductive material, in particular from a metal. The at least one contact element is attached, for example bonded, to the carrier element. The at least one contact element is embodied, for example, as an SMD pad.

A coil arrangement, in which the carrier element comprises at least one desired parting location which runs in the region of the at least one contact element, ensures easy and flexible use. By virtue of the fact that the at least one desired parting location runs in the region of the at least one contact element, the coil arrangement can be easily adapted to the circumference of a rotating component and can be separated from an endless coil arrangement between two coils which are connected to one another. A desired parting location, which runs in the region of a contact element, is preferably formed between, in each case, two coils which are connected in series and are arranged in succession in the main direction of extent.

A coil arrangement, in which the at least one contact element comprises a first contact region and a second contact region which are spaced apart from one another in the main direction of extent and are connected to one another by a connecting region, ensures easy and flexible use. The contact regions preferably have a greater width perpendicularly with respect to the main direction of extent than the connecting region. As a result, the contact regions provide, on the one hand, a sufficiently large contact face for forming contact with the coils and, on the other hand, the connecting region permits easy disconnection of the endless coil arrangement between two coils which are connected to one another. The carrier element preferably comprises a desired parting location in the respective connecting region. This permits easy disconnection of the carrier element and of the coils which are arranged thereon and connected to one another. The at least one contact element is preferably embodied in an H shape.

The invention is also based on an object of providing a device for the wireless electromagnetic transmission of energy, which can be used in an easy and flexible way for a wide variety of rotatable components.

This object is achieved by means of a device for the wireless electromagnetic transmission of energy, having
  a transmitter unit for transmitting energy which is transmittable in a wireless fashion, and
  a receiver unit for receiving energy which is transmitted in a wireless fashion,
wherein at least one of the units comprises a coil arrangement according to the invention.

The advantages of the device according to the invention correspond to the advantages already described for the coil arrangement according to the invention. The receiver unit preferably comprises the coil arrangement according to the invention for receiving energy transmitted in a wireless fashion to a rotatable component.

The invention is also based on an object of providing a component coil arrangement for the wireless electromagnetic transmission of energy, which arrangement can be produced easily.

This object is achieved by a component coil arrangement for the wireless electromagnetic transmission of energy, having
  a component which is mounted so as to be rotatable about a rotational axis, and
  a coil arrangement according to the invention, wherein
    the carrier element is attached to the component, and
    the coils are arranged about the rotational axis.

The coil arrangement can be adapted easily and flexibly in respect to its length $L_U$ to the circumference of the component. As a result, the carrier element can be easily attached to the curved surface of the component such that the coils are arranged about the rotational axis of the component. When the component rotates, a wireless electromagnetic transmission of energy is made possible in an easy way. The further advantages of the component coil arrangement according to the invention correspond to the advantages already described for the coil arrangement according to the invention.

The invention is also based on an object of providing a method which makes it possible to easily produce a component coil arrangement.

This object is achieved by a method having for producing a component coil arrangement, comprising the steps:

providing a coil arrangement according the invention, and attaching the carrier element to a component which is mounted so as to be rotatable about a rotational axis in such a way that the coils are arranged about the rotational axis.

Firstly, an endless coil arrangement is preferably provided. By dividing the endless coil arrangement, the coil arrangement is provided with a length $L_U$ which is adapted to the circumference of the component. The carrier element is subsequently attached to the component in such a way that the coils are arranged about the rotational axis. This permits a wireless electromagnetic transmission of energy in an easy way. The further advantages of the method according to the invention correspond to the advantages already described for the component coil arrangement or the coil arrangement.

Further features, advantages and details of the invention can be found in the following description of a plurality of exemplary embodiments. NUR

DESCRIPTION OF THE PREFERRED EMBODIMENTS

Figure 1:
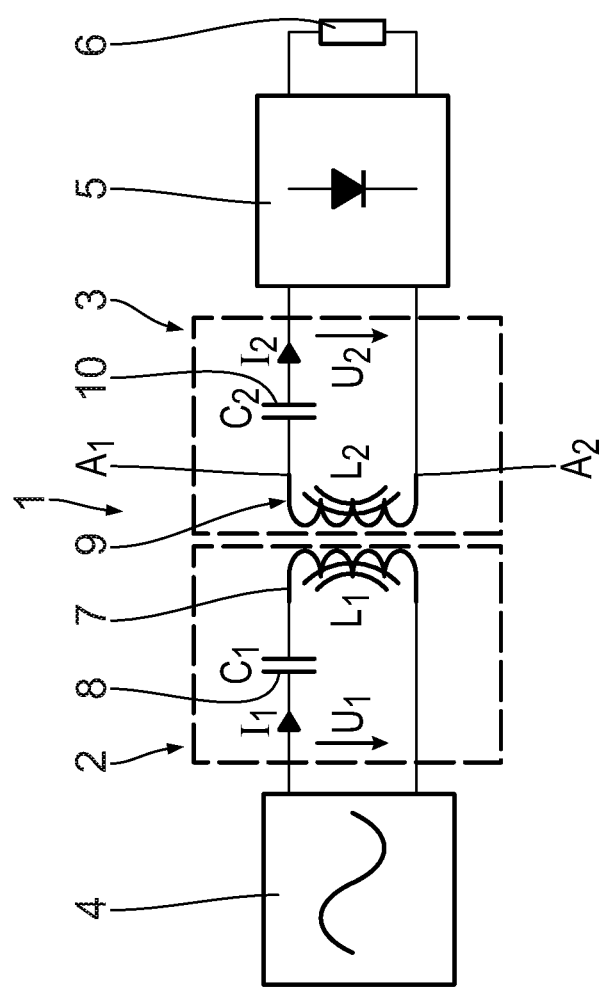
FIG. 1 shows a circuit diagram of a device for the wireless electromagnetic transmission of energy with a transmitter unit and a receiver unit.

A first exemplary embodiment of the invention is described below with reference to FIGS. 1 to 6. A device 1 for the wireless electromagnetic transmission of energy comprises a transmitter unit 2 for transmitting energy which can be transmitted in a wireless fashion and a receiver unit 3 for receiving the energy which is transmitted in a wireless fashion. The transmitter unit 2 is connected to an energy source 4 which makes available an alternating voltage $U_1$ and/or an alternating current $I_1$. The receiver unit 3 is connected to a rectifier 5. The rectifier 5 rectifies an alternating voltage $U_2$ provided by the receiver unit 3 and/or a provided alternating current $I_2$ and supplies a consumer 6. The consumer 6 is embodied, for example, as a measuring sensor.

The transmitter unit 2 comprises a primary-side coil 7 which is connected in series with a primary-side capacitor 8. The primary-side coil 7 has an inductor $L_1$. The primary-side capacitor 8 has a capacitor $C_1$. The transmitter unit 2 is known and customary.

The receiver unit 3 comprises a coil arrangement 9. The coil arrangement 9 is therefore arranged on the secondary side. The coil arrangement 9 has an inductor $L_2$. The coil arrangement 9 is connected in series with a secondary-side capacitor 10. The secondary-side capacitor has a capacitance $C_2$. The device 1 is illustrated in FIG. 1.

The coil arrangement 9 is attached to a component 11 which is mounted so as to be rotatable about a rotational axis 12. The component 11 and the coil arrangement 9 which is attached thereto form a component coil arrangement 13. The component 11 is embodied in the form of a shaft and has a radius R. The following applies for a circumference U of the component 11 about the rotational axis 12: $U=2 \cdot \pi \cdot R$, where $\pi$ is the pi constant.

The coil arrangement 9 comprises a carrier element 14 which is embodied in the form of a ribbon and defines a main direction of extent 15. A plurality of coils $S_1$ to $S_N$ and contact elements 16 are attached, for example bonded, to a first side of the carrier element 14. The coils $S_1$ to $S_N$ are connected in series with one another by means of the contact elements 16. The contact elements 16 are made of an electrically conductive metal, for example of copper.

The coils $S_1$ to $S_N$ are wound in a spiral shape and have precisely one winding layer. The coils $S_1$ to $S_N$ are attached to the carrier element 14 in such a way that a respective coil axis $A_S$ runs perpendicularly with respect to a carrier element surface. The coils $S_1$ to $S_N$ each have an inner connecting contact $A_i$ and an outer connecting contact $A_o$. The connecting contacts $A_i$ and $A_o$ enclose an angle $\alpha$ with one another, wherein the following applies: $\alpha \approx 180°$. The connecting contacts $A_i$ and $A_o$ therefore run essentially along a straight line. The connecting contacts $A_i$ and $A_o$ are connected in an electrically conductive fashion, for example soldered, to respective adjacent contact elements 16.

Figure 2:
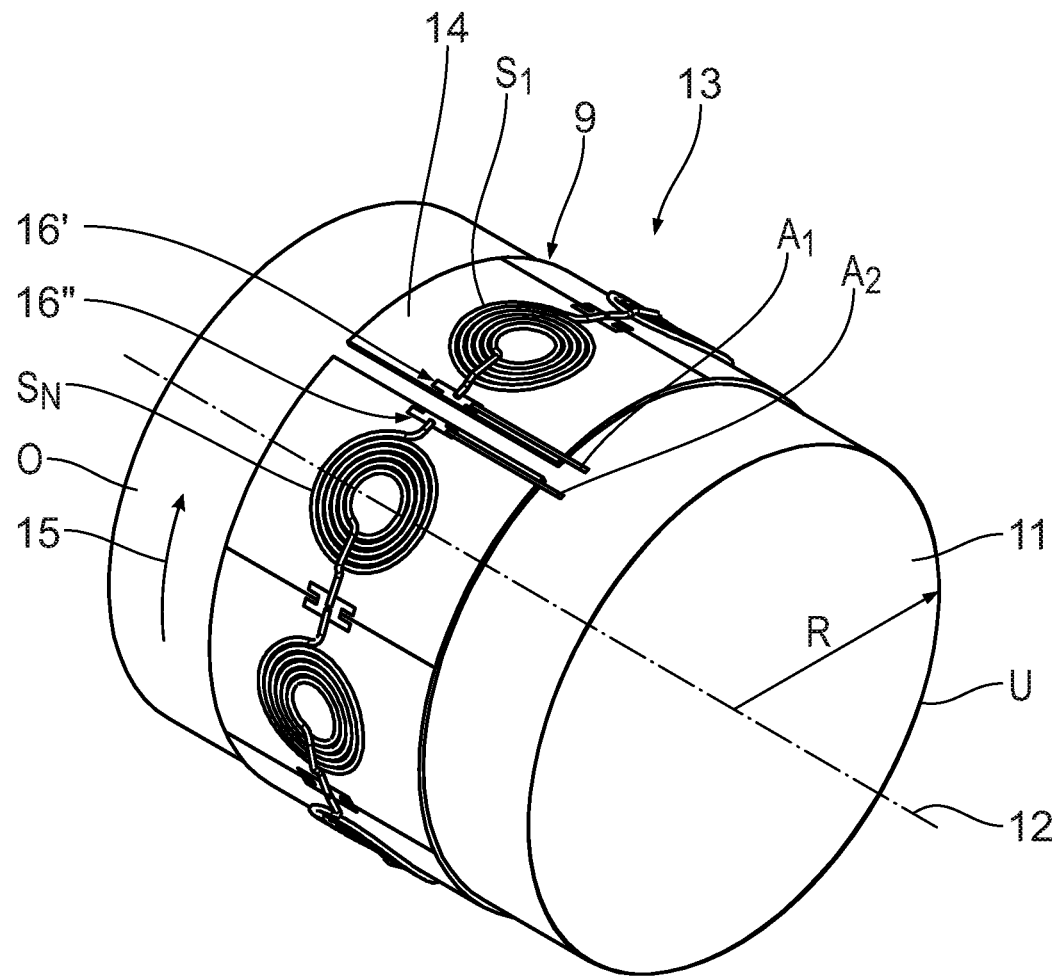
FIG. 2 shows a perspective view of a component coil arrangement with a coil arrangement according to a first exemplary embodiment which is attached to a rotatably mounted component.

The carrier element 14 has a length $L_U$ in the main direction of extent 15, a width B perpendicularly with respect to the main direction of extent 15, and a thickness D perpendicularly with respect to a surface thereof. The carrier element 14 is embodied in a deformable fashion so that the carrier element 14 and/or the coil arrangement 9 can be attached to the curved surface O of the component 11 about the rotational axis 12, as is illustrated in FIG. 2. The following preferably applies to the thickness D: 0.1 mm≤D≤2.5 mm, in particular 0.5 mm≤D≤2 mm, and in particular 1 mm≤D≤1.5 mm. The carrier element 14 is, for example, preferably produced from a deformable ferrite material. For attaching the coil arrangement 9 to the component 11, an attachment means 17 is arranged on a side of the carrier element 14 facing away from the coils $S_1$ to $S_N$. The attachment means 17 is, for example, a layer of adhesive.

The contact elements 16 are embodied in an H shape and each have a first contact region $K_1$ and a second contact region $K_2$ which are connected to one another by a connecting region V. The contact regions $K_1$ and $K_2$ are spaced apart from one another in the main direction of extent 15. The connecting region V which connects the contact regions $K_1$ and $K_2$ have, perpendicularly with respect to the main direction of extent 15, a width $B_V$ which is smaller in comparison with a width $B_K$ of the contact regions $K_1$ and $K_2$.

The carrier element 14 comprises desired parting locations T which are embodied, for example, as a perforation and/or as a notch arrangement in the carrier element 14. The desired parting locations T run perpendicularly with respect to the main direction of extent 15. The desired parting locations T are each formed between two of the coils $S_1$ to $S_N$ in the connecting region V of the respective contact element 16. In each case two adjacent parting locations T are spaced apart from one another in the main direction of extent 15 by a length or a modular dimension $\Delta L_U$.

At a first end 18, the coil arrangement 9 has a contact element 16' which comprises merely one connecting region V and a contact region $K_2$ adjoining the latter. At a second end 19, the coil arrangement 9 correspondingly comprises a contact element 16", which comprises a connecting region V and a contact region $K_1$ adjoining the latter. The contact element 16', 16" each correspond to one half of a contact element 16.

In order to connect the coil arrangement 9 in an electrically conductive fashion to the secondary-side capacitor 10 and to the rectifier 5, respective connecting lines $A_1$ and $A_2$ are attached to the contact elements 16' and 16". The connecting lines $A_1$ and $A_2$ are soldered, for example, to the contact elements 16' and 16". The connecting lines $A_1$, $A_2$ run transversely with respect to the main direction of extent 15.

The coil arrangement 9 is embodied in a modular fashion. The coil arrangement 9 comprises coil modules $M_1$ to $M_N$. N denotes the number of coil modules, which in the present exemplary embodiment is identical to the number of coils $S_1$ to $S_N$. The coil modules $M_1$ to $M_N$ each have the length $\Delta L_U$ in the main direction of extent 15. Adjacent coil modules $M_1$ to $M_N$ are delimited from one another by the desired parting locations T.

The following applies to the length $L_U$: $L_U = N \cdot \Delta L_U$. The length $L_U$ is adapted to the circumference U of the component 11. In particular the following applies: $0.8 \cdot U \leq L_U \leq U$, in particular $0.9 \cdot U \leq L_U \leq 0.99 \cdot U$, and in particular $0.95 \cdot U \leq L_U \leq 0.98 \cdot U$.

Figure 3:
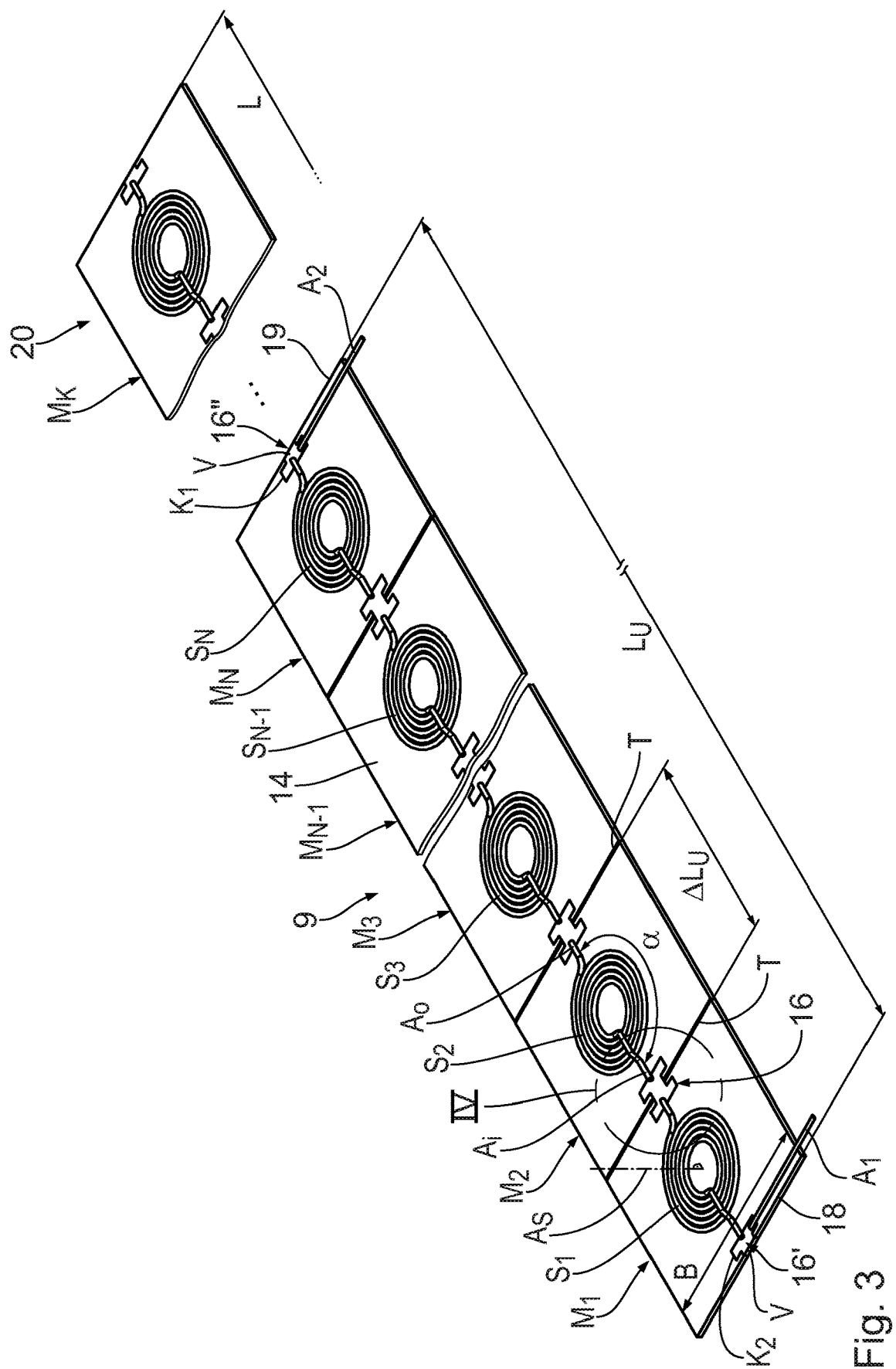
FIG. 3 shows a perspective view of an endless coil arrangement for producing the coil arrangement.
Figure 4:
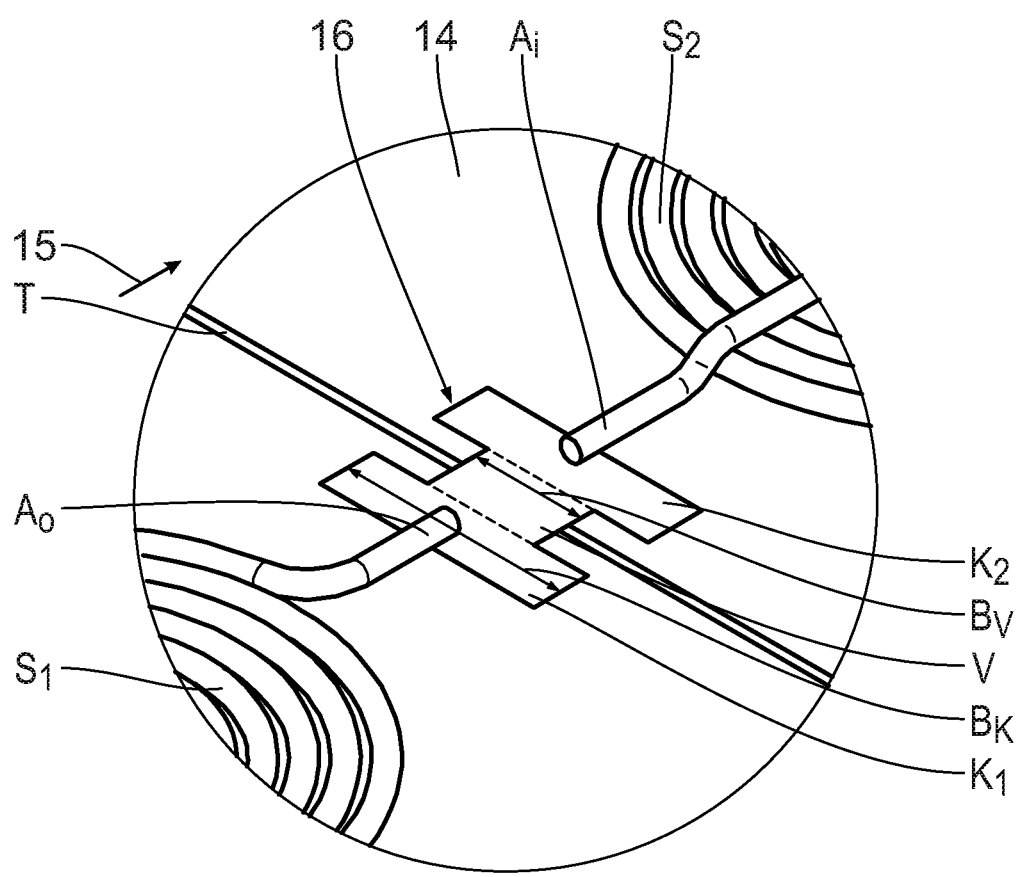
FIG. 4 shows an enlarged perspective view of the coil arrangement in the region of a contact element.
Figure 5:
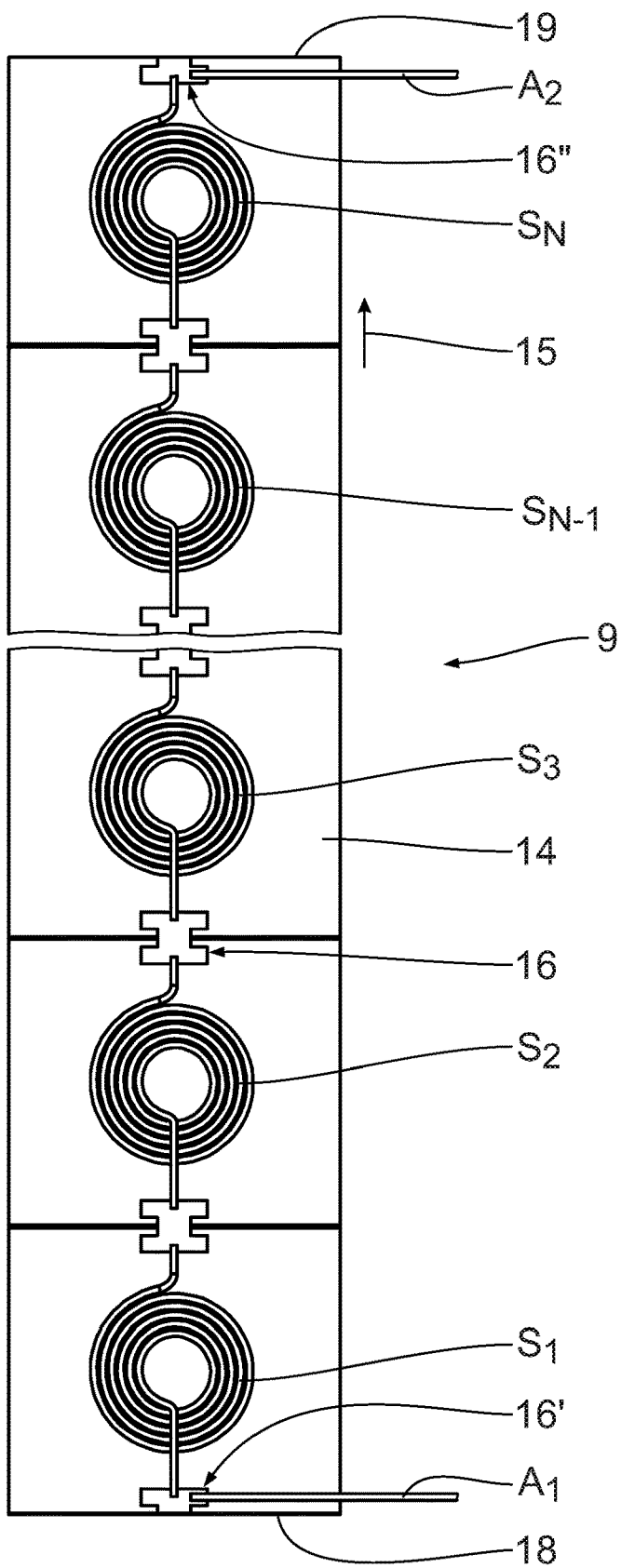
FIG. 5 shows a plan view of the coil arrangement.
Figure 6:
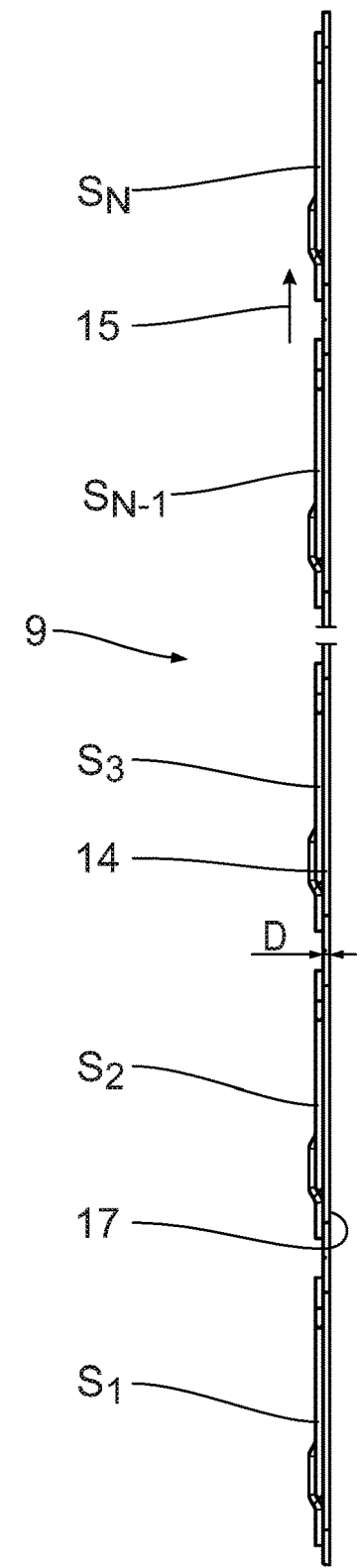
FIG. 6 shows a side view of the coil arrangement.

The production of the component coil arrangement 13 is as follows:

The coil arrangement 9 is disconnected from an endless coil arrangement 20. The endless coil arrangement 20 is illustrated in FIG. 3. The endless coil arrangement 20 comprises a multiplicity of coil modules $M_1$ to $M_K$, where K denotes the number of coil modules of the endless coil arrangement 20. The following applies to the number K: $K > N$, in particular $K \gg N$. The endless coil arrangement 20 has a length L in the main direction of extent 15, where the following applies: $L > L_U$, in particular $L \gg L_U$. The attachment means 17 of the endless coil arrangement 20 is covered, for example, by a separating layer so that the endless coil arrangement 20 can be mounted as a reel and/or in reel packaging.

A desired number N of coil modules is disconnected from the endless coil arrangement 20 so that the coil arrangement 9 which is produced as a result has the desired length $L_U$. In order to perform the disconnection, the carrier element 14 is cut at desired parting location T between the coil modules $M_N$ and $M_{N+1}$, as is the associated contact element 16, so that the coil arrangement 9 comprises the coil modules $M_1$ to $M_N$ and the contact element 16".

For the purpose of attachment, the separating layer is removed so that the attachment means 17 of the coil arrangement 9 is exposed. The coil arrangement 9 is subsequently attached to the surface O of the component 11 in such a way that the coils $S_1$ to $S_N$ which are arranged in succession in the main direction of extent 15 are arranged about the rotational axis 12. The connecting lines $A_1$ and $A_2$ are then connected to the contact elements 16' and 16", and the connecting lines $A_1$ and $A_2$ are connected to the secondary-side capacitor 10 and the rectifier 5.

While the device 1 is operating, energy is transmitted electromagnetically to the receiver unit 3 by means of the stationary transmitter unit 2. The transmission of energy to the rotating component 11 is carried out easily and efficiently by the component coil arrangement 13. The transmitted energy supplies the consumer 6 via the rectifier 5.

Figure 7:
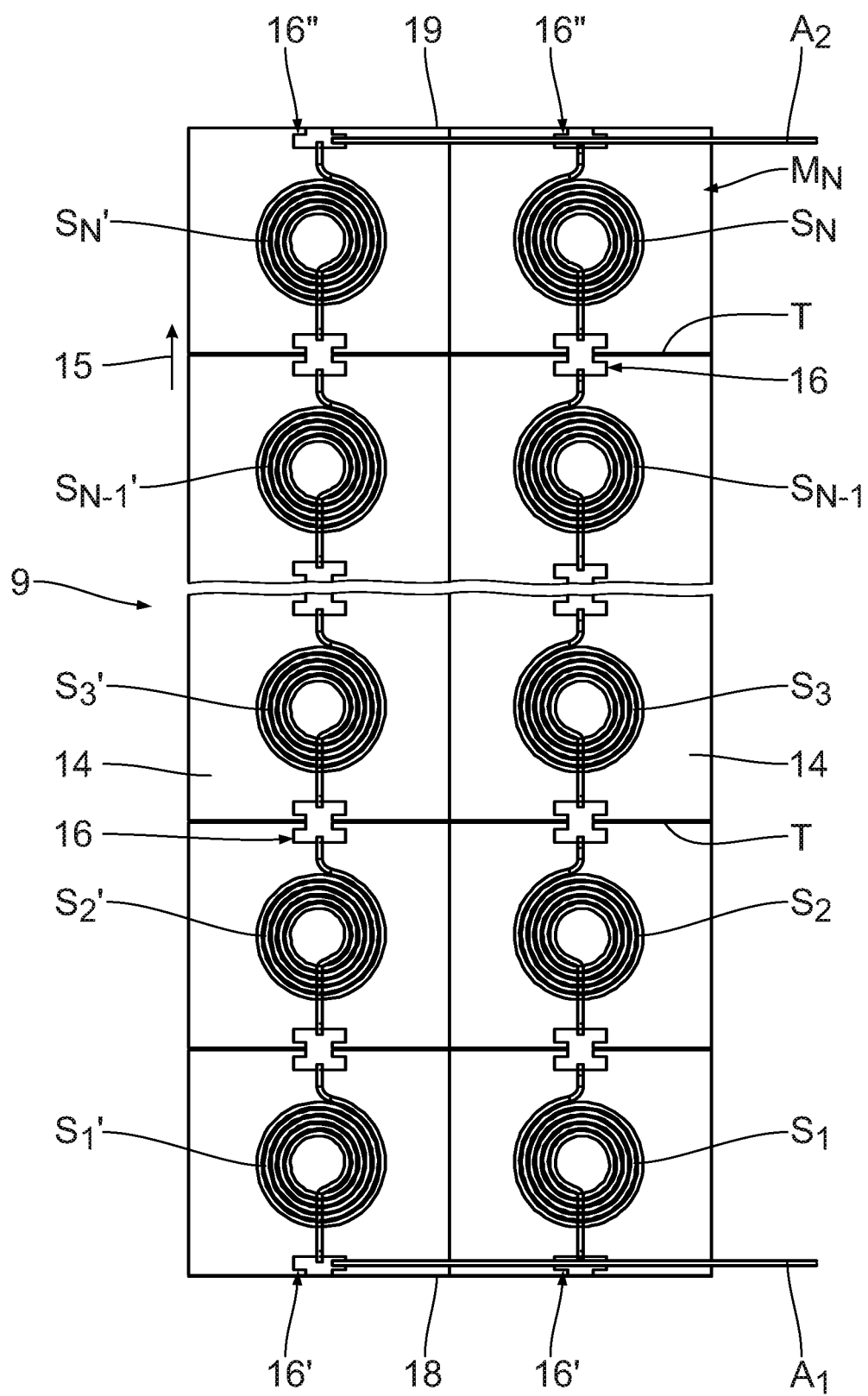
FIG. 7 shows a plan view of a coil arrangement according to a second exemplary embodiment.

A second exemplary embodiment of the invention is described below with reference to FIG. 7. In contrast to the preceding exemplary embodiment, the coil arrangement 9 is embodied in two rows. On the carrier element 14, the coils $S_1$ to $S_N$ are arranged in succession in the main direction of extent 15 and are connected in series with one another by means of the contact elements 16. In addition to the coils $S_1$ to $S_N$, further coils $S_1'$ to $S_N'$ are arranged on the carrier element 14. The coils $S_1'$ to $S_N'$ are arranged in succession in the main direction of extent 15 and are connected in series by means of contact elements 16. The coil modules $M_1$ to $M_N$ which are delimited by the desired parting locations T therefore each have two coils $S_1$, $S_1'$ to $S_N$, $S_N'$. At the first end 18, the coils $S_1$, $S_1'$ are connected to the first connecting line $A_1$ by means of the contact element 16'. In a corresponding way, the coils $S_N$, $S_N'$ are connected at the second end 19 to the second connecting line $A_2$ by means of the contact element 16". The series connections of the coils $S_1$ to $S_N$ and $S_1'$ to $S_N'$ are therefore connected in parallel by means of the connecting lines $A_1$ and $A_2$. Reference is made to the preceding exemplary embodiment with respect to the further design and the further method of functioning as well as the production of the component coil arrangement 13.

Figure 8:
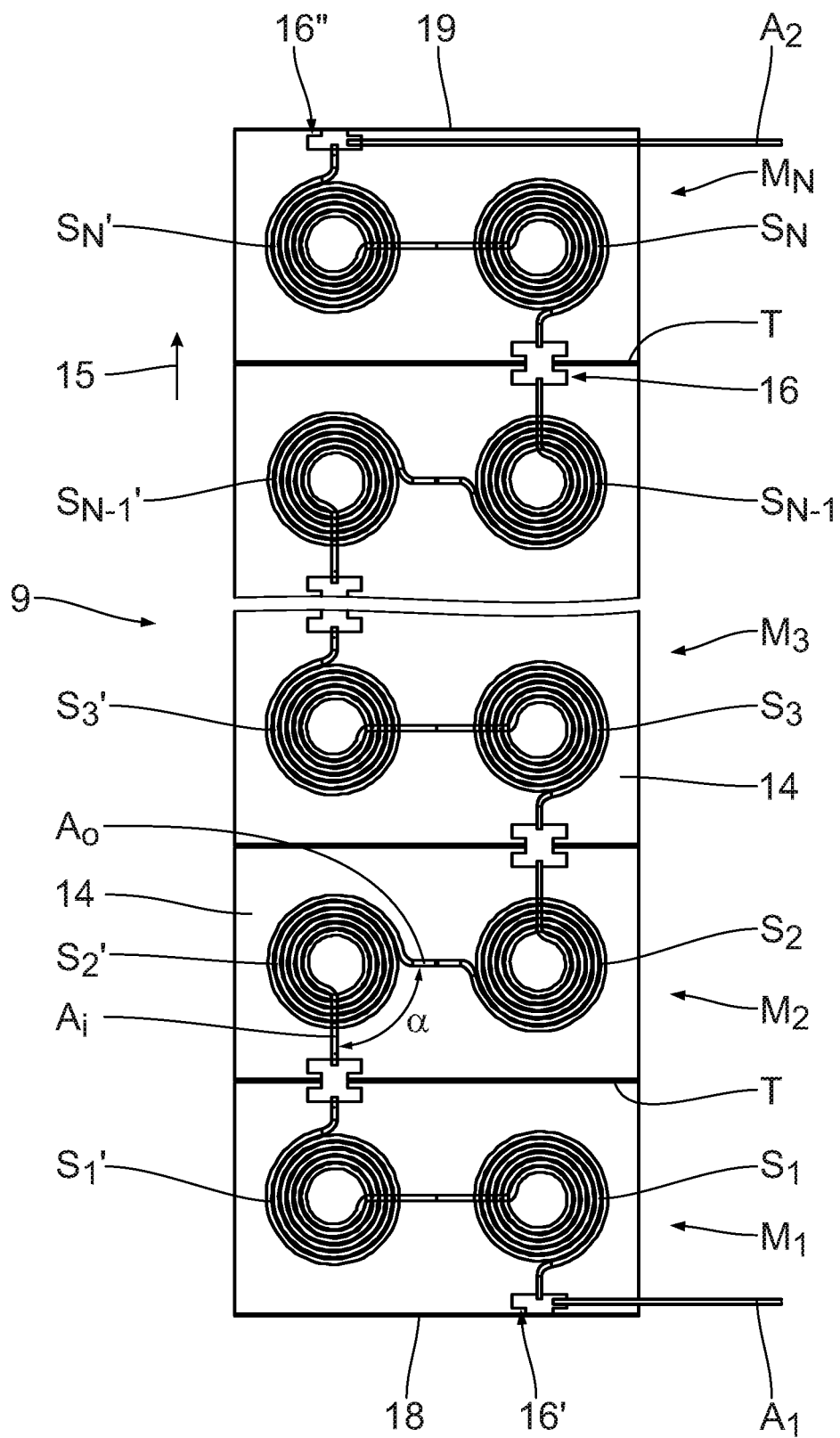
FIG. 8 shows a plan view of a coil arrangement according to a third exemplary embodiment.

A third exemplary embodiment of the invention is described below with reference to FIG. 8. In contrast to the preceding exemplary embodiments, the coil arrangement 9 comprises a meandering series connection of coils $S_1$, $S_1'$ to $S_N$, $S_N'$. The coil modules $M_1$ to $M_N$ which are delimited by the desired parting locations T therefore each have two coils $S_1$, $S_1'$ to $S_N$, $S_N'$. In order to form the meandering series connection, the following applies to the angle $\alpha$ between the connecting contacts $A_i$ and $A_o$: $\alpha \approx 90°$. The coils $S_1$, $S_1'$ to $S_N$, $S_N'$ of the respective coil module $M_1$ to $M_N$ are connected to one another in an electrically conductive fashion. For this purpose, the coils $S_1$, $S_1'$ to $S_N$, $S_N'$ are made, for example, from a common wire and/or soldered to a common contact element. The connecting lines $A_1$ and $A_2$ are connected to the contact elements 16' and 16". Reference is made to the preceding exemplary embodiments with respect to the further design and the further method of functioning as well as the production of the component coil arrangement 13.

The following applies generally:

The device 1 serves for the wireless transmission of energy and for supplying rotating components 11 with electrical energy. For this purpose, the coil arrangement 9 is attached to the rotating component 11. The coil arrangement 9 can be provided easily and flexibly by means of an endless coil arrangement 20. The endless coil arrangement 20 is of modular design, so that the coil arrangement 9 can be provided with a desired number of coil modules and a desired length by disconnection from the endless coil arrangement 20. The endless coil arrangement 20 therefore forms an endless coil array. In particular, the coil arrangement 9 can be attached easily to the curved surface of the rotating component 11 by virtue of the coils being embodied as flat coils and by means of the deformable carrier element 14. The length $\Delta L_U$ of the coil modules can be set by means of the diameter of the flat coils. The smaller the length $\Delta L_U$ is, the more precisely the coil arrangement 9 can be adapted in its length $L_U$ to the scope of the rotating component 11.

The coil arrangement 9 can be embodied in a single row or a plurality of rows. The carrier element 14 can be manufactured from a ferrite material and/or some other flexible carrier material. The coils can form a series circuit and/or a parallel circuit.

The coil arrangement 9 can be adapted easily and flexibly to rotating components 11, in particular rotating shafts, in industrial installations for the transmission of signals and/or energy. As a result, devices 1 for the electromagnetic transmission of energy in industrial installations can be repaired easily and quickly and down times can be minimized.

What is claimed is:

1. A coil arrangement for the wireless electromagnetic transmission of energy, having
    a carrier element which is embodied in the form of a deformable ribbon and is mountable to a curved surface of a rotatable component and forms a main direction of extent, the carrier element defining a plurality of parting locations; and
    a plurality of coils, wherein at least some of the plurality of coils are attached to the carrier element in the main direction of extent and connected to one another,
    wherein the carrier element comprises a ferrite material, and wherein the plurality of parting locations are designed as at least one of a perforation and a notch arrangement, one of the plurality of parting locations being arranged between each of the plurality of coils; and wherein: at least one contact element for forming contact with coils is arranged on the carrier element, wherein the at least one contact element is embodied in an H-shape and has a first contact region and a second contact region which are connected to one another by a connecting region, wherein one of the plurality of parting locations runs in the connecting region.

2. The coil arrangement according to claim 1, wherein the carrier element has a thickness D, wherein the following applies: 0.1 mm≤D≤2.5 mm.

3. The coil arrangement according to claim 1, wherein the carrier element has a thickness D, wherein the following applies: 0.5 mm≤D≤2 mm.

4. The coil arrangement according to claim 1, wherein the carrier element has a thickness D, wherein the following applies: 1 mm≤D≤1.5 mm.

5. The coil arrangement according to claim 1, wherein the carrier element is of deformable design for arrangement on the curved surface of the component.

6. The coil arrangement according to claim 1, wherein an attachment means for attaching to the component is arranged on a side of the carrier element facing away from the plurality of coils.

7. The coil arrangement according to claim 6, wherein the attachment means is at least one of an adhesive layer, a double-sided adhesive tape, an adhesive film and touch and close fasteners.

8. The coil arrangement according to claim 1, wherein the coils are connected in series.

9. The coil arrangement according to claim 1, wherein the plurality of parting locations are spaced apart in the main direction of extent.

10. The coil arrangement according to claim 1, wherein the plurality of coils are wound in a spiral shape.

11. The coil arrangement according to claim 1, wherein the plurality of coils each comprise two connecting contacts which are arranged offset with respect to one another by an angle α, wherein the following applies: 60°≤α≤300°.

12. The coil arrangement according to claim 1, wherein the plurality of coils each comprise two connecting contacts which are arranged offset with respect to one another by an angle α, wherein the following applies: 90°≤α≤270°.

13. The coil arrangement according to claim 1, wherein the plurality of coils each comprise two connecting contacts which are arranged offset with respect to one another by an angle α, wherein the following applies: 120°≤α≤240°.

14. The coil arrangement according to claim 1, wherein at least one contact element for forming contact with one of the plurality of coils is arranged on the carrier element.

15. The coil arrangement according to claim 14, wherein the carrier element comprises at least one parting location which runs in the region of the at least one contact element.

16. The coil arrangement according to claim 14, wherein the at least one contact element comprises a first contact region and a second contact region which are spaced apart from one another in the main direction of extent and are connected to one another by a connecting region.

17. The coil arrangement according to claim 1, wherein the carrier element has a thickness D, wherein the following applies: 0.1 mm≤D≤1.5 mm.

18. The coil arrangement according to claim 1, wherein the at least one desired parting location runs transversely with respect to the main direction of extent.

19. The coil arrangement according to claim 1, wherein:
    at least one contact element for forming contact with coils is arranged on the carrier element, wherein the at least one contact element comprises a first contact region and a second contact region which are spaced apart from one another in the main direction of extent and are connected to one another by a connecting region, wherein the first contact region and the second contact region have a greater width perpendicularly with respect to the main direction of extent than the connecting region and one of the plurality of parting locations runs in the connecting region.

20. A device for the wireless electromagnetic transmission of energy, having
    a transmitter unit for transmitting energy which is transmittable in a wireless fashion, and
    a receiver unit for receiving energy which is transmitted in a wireless fashion, wherein at least one of the transmitter unit and the receiver unit comprises a coil arrangement for the wireless electromagnetic transmission of energy, having
    a carrier element which is embodied in the form of a deformable ribbon and is mountable to a curved surface of a rotatable component and forms a main direction of extent, the carrier element defining a plurality of parting locations; and
    a plurality of coils, wherein at least some of the plurality of coils are attached to the carrier element in the main direction of extent and connected to one another, wherein the carrier element comprises a ferrite material, and wherein the plurality of parting locations are designed as at least one of a perforation and notch arrangement, one of the plurality of parting locations being arranged between each of the plurality of coils; and wherein: at least one contact element for forming contact with coils is arranged on the carrier element, wherein the at least one contact element is embodied in an H-shape and has a first contact region and a second contact region which are connected to one another by a connecting region, wherein one of the plurality of parting locations runs in the connecting region.

21. The device according to claim 20, wherein:
at least one contact element for forming contact with coils is arranged on the carrier element, wherein the at least one contact element comprises a first contact region and a second contact region which are spaced apart from one another in the main direction of extent and are connected to one another by a connecting region, wherein the first contact region and the second contact region have a greater width perpendicularly with respect to the main direction of extent than the connecting region and one of the plurality of parting locations runs in the connecting region.

22. A component coil arrangement for the wireless electromagnetic transmission of energy, having
a component which is mounted so as to be rotatable about a rotational axis, and
a coil arrangement for the wireless electromagnetic transmission of energy, having
a carrier element which is embodied in the form of a deformable ribbon and is mountable to a curved surface of the rotatable component and forms a main direction of extent, the carrier element defining a plurality of parting locations; and
a plurality of coils, wherein at least some of the plurality of coils are attached to the carrier element in the main direction of extent and connected to one another, wherein the carrier element comprises a ferrite material, and wherein the plurality of parting locations are designed as at least one of a perforation and a notch arrangement, one of the plurality of parting locations being arranged between each of the plurality of coils,
wherein
the carrier element is attached to the component, and
the coils are arranged about the rotational axis; and wherein: at least one contact element for forming contact with coils is arranged on the carrier element, wherein the at least one contact element is embodied in an H-shape and has a first contact region and a second contact region which are connected to one another by a connecting region, wherein one of the plurality of parting locations runs in the connecting region.

23. The component coil arrangement according to claim 22, wherein:
at least one contact element for forming contact with coils is arranged on the carrier element, wherein the at least one contact element comprises a first contact region and a second contact region which are spaced apart from one another in the main direction of extent and are connected to one another by a connecting region, wherein the first contact region and the second contact region have a greater width perpendicularly with respect to the main direction of extent than the connecting region and one of the plurality of parting locations runs in the connecting region.

24. A method for producing a component coil arrangement, comprising the steps:
providing a coil arrangement for the wireless electromagnetic transmission of energy, having
a carrier element which is embodied in the form of a deformable ribbon and is mountable to a curved surface of a rotatable component and forms a main direction of extent, and
a plurality of coils, wherein at least some of the coils are attached to the carrier element in the main direction of extent and connected to one another, wherein the carrier element comprises a ferrite material, and wherein the plurality of parting locations are designed as at least one of a perforation and a notch arrangement, one of the plurality of parting locations being arranged between each of the plurality of coils
and
attaching the carrier element to the component which is mounted so as to be rotatable about a rotational axis in such a way that the coils are arranged about the rotational axis; and wherein: at least one contact element for forming contact with coils is arranged on the carrier element, wherein the at least one contact element is embodied in an H-shape and has a first contact region and a second contact region which are connected to one another by a connecting region, wherein one of the plurality of parting locations runs in the connecting region.

25. The method according to claim 24, wherein the coils are electrically connected in series.

26. The method according to claim 24, wherein:
at least one contact element for forming contact with coils is arranged on the carrier element, wherein the at least one contact element comprises a first contact region and a second contact region which are spaced apart from one another in the main direction of extent and are connected to one another by a connecting region, wherein the first contact region and the second contact region have a greater width perpendicularly with respect to the main direction of extent than the connecting region and one of the plurality of parting locations runs in the connecting region.

* * * * *